(12) United States Patent
Sato et al.

(10) Patent No.: US 10,359,660 B2
(45) Date of Patent: Jul. 23, 2019

(54) DISPLAY DEVICE

(71) Applicant: Japan Display Inc., Minato-ku (JP)

(72) Inventors: Shuhei Sato, Tokyo (JP); Takehiko Ishiu, Tokyo (JP); Kazunori Hayakawa, Tokyo (JP); Shou Yanagisawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/942,644

(22) Filed: Apr. 2, 2018

(65) Prior Publication Data
US 2018/0284529 A1 Oct. 4, 2018

(30) Foreign Application Priority Data
Apr. 3, 2017 (JP) ................... 2017-073590

(51) Int. Cl.
*G02F 1/1335* (2006.01)
*G02F 1/1333* (2006.01)

(52) U.S. Cl.
CPC ........... *G02F 1/133512* (2013.01); *G02F 2001/133302* (2013.01); *G02F 2001/133388* (2013.01); *G02F 2201/50* (2013.01); *G02F 2201/56* (2013.01)

(58) Field of Classification Search
CPC .............................. G02F 1/133512
See application file for complete search history.

(56) References Cited

U.S. PATENT DOCUMENTS

| 2011/0025940 A1* | 2/2011 | Liu ................. G02F 1/1333 349/56 |
| 2012/0320329 A1 | 12/2012 | Lee et al. |
| 2013/0271710 A1* | 10/2013 | Tatemura ......... G02F 1/133512 349/110 |
| 2016/0202547 A1 | 7/2016 | Tatemura et al. |

FOREIGN PATENT DOCUMENTS

| JP | 11-326881 | 11/1999 |
| JP | 2001-42303 | 2/2001 |
| JP | 2004-151551 | 5/2004 |
| JP | 2013-3570 | 1/2013 |
| JP | 2013-221959 | 10/2013 |

* cited by examiner

*Primary Examiner* — Edmond C Lau
(74) *Attorney, Agent, or Firm* — Oblon, McClelland, Maier & Neustadt, L.L.P.

(57) ABSTRACT

According to one embodiment, a display device includes a first substrate having a first surface, a second surface opposite to the first surface and a first side surface, and a second substrate having a third surface opposed to the first surface, a fourth surface opposite to the third surface and a second side. The first substrate has a first inclined surface which is continuous with the first surface and the first side surface, the second substrate has a second inclined surface which is continuous with the fourth surface and the second side surface, and a first width of the first inclined surface is less than a second width of the second inclined surface.

16 Claims, 9 Drawing Sheets

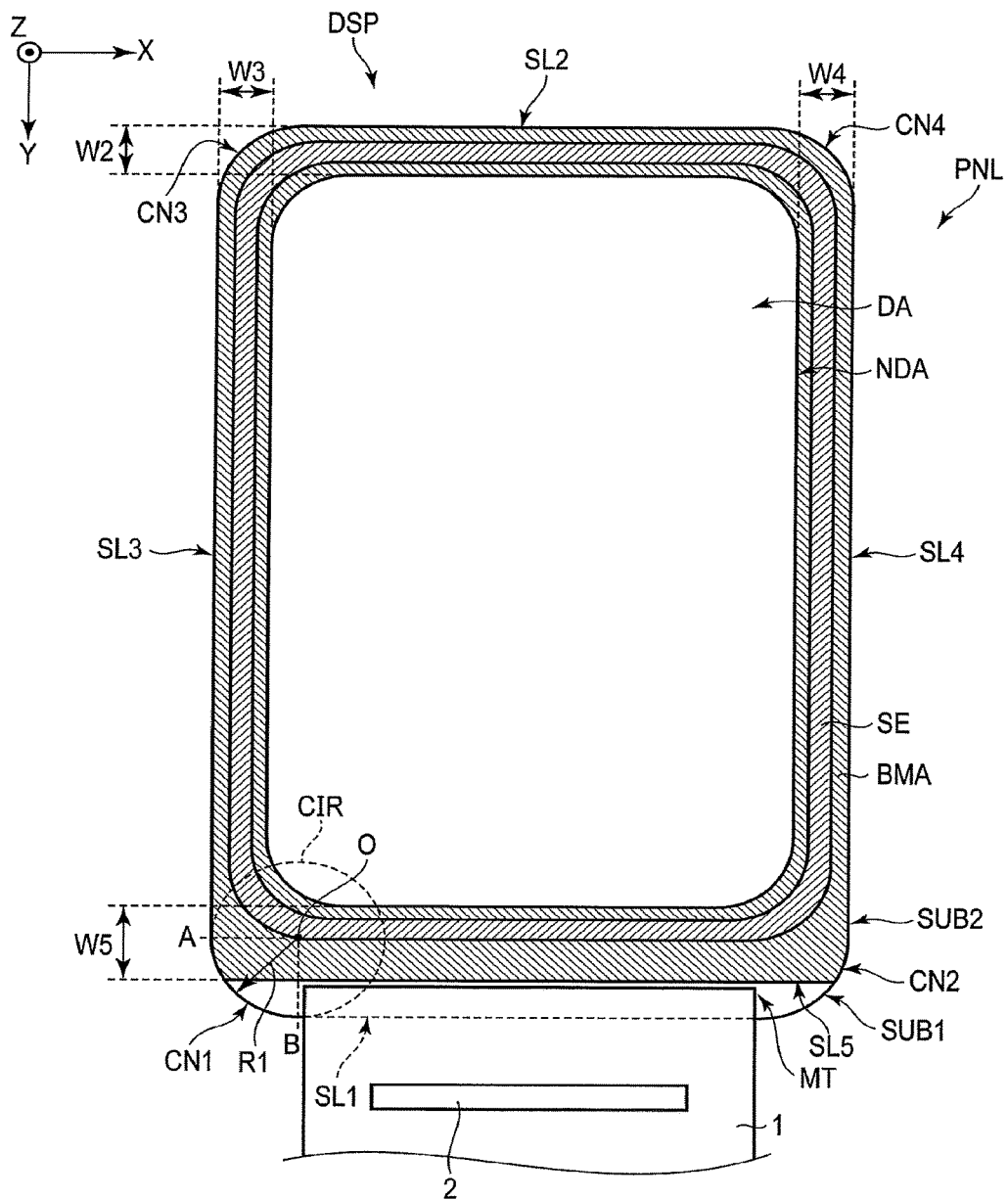
F I G. 1

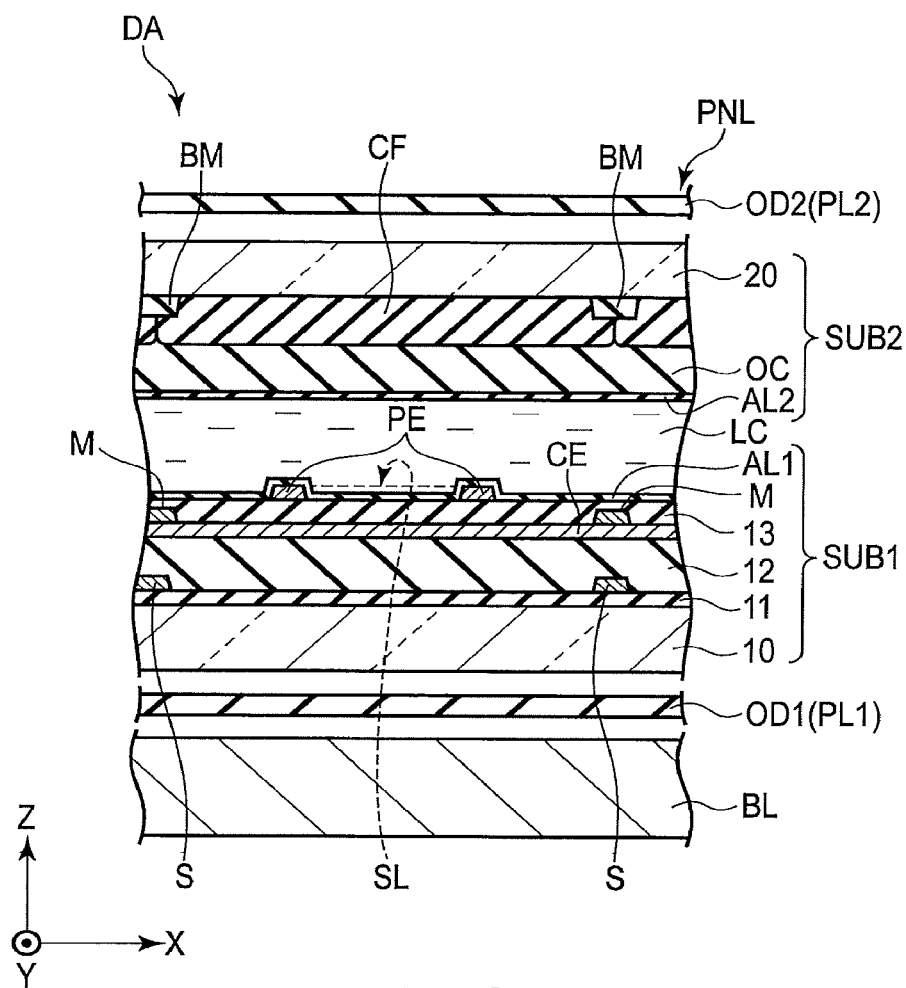
F I G. 2

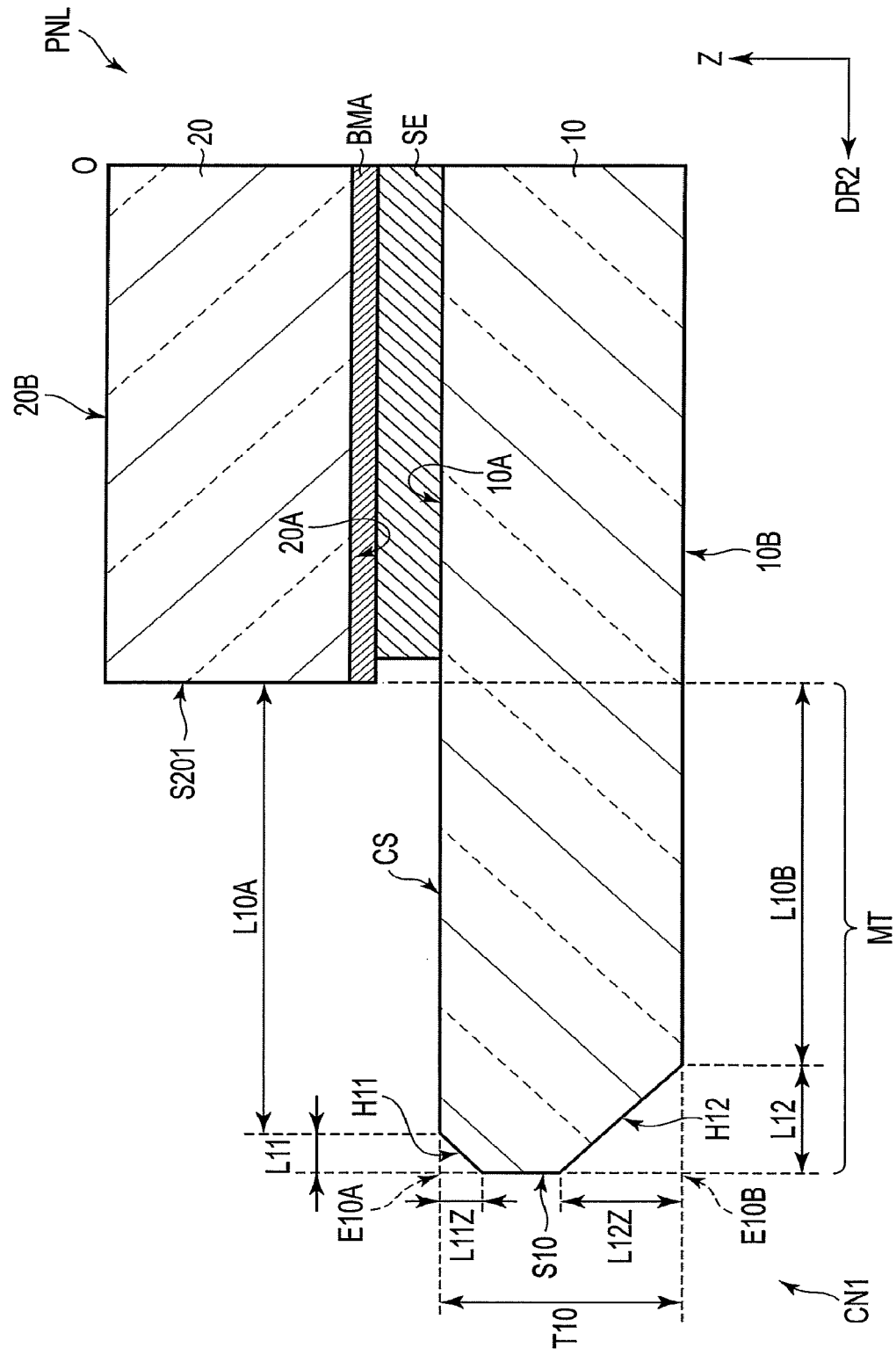
F I G. 5

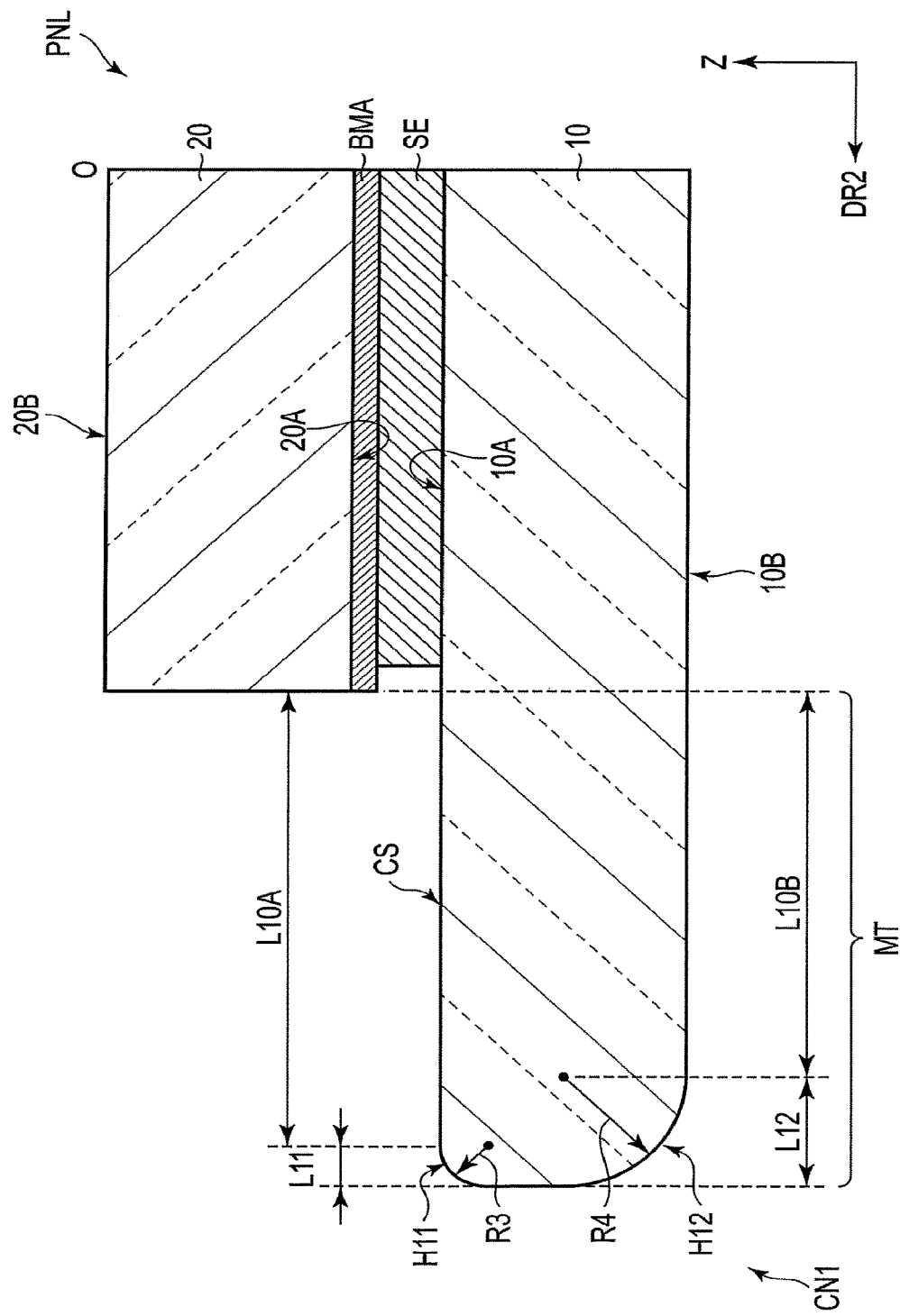
F I G. 8

DISPLAY DEVICE

CROSS-REFERENCE TO RELATED APPLICATIONS

This application is based upon and claims the benefit of priority from Japanese Patent Application No. 2017-073590, filed Apr. 3, 2017, the entire contents of which are incorporated herein by reference.

FIELD

Embodiments described herein relate generally to a display device.

BACKGROUND

In a display device such as a liquid crystal display device, a first substrate which is provided with a switching element such as a thin film transistor, and a second substrate which is provided with a color filter, etc., are attached to each other such that the first substrate and the second substrate are opposed to each other. The first substrate and the second substrate are glass substrates, for example, and since the first substrate and the second substrate are easily breakable at edges thereof, the strength needs to be improved at the edges.

BRIEF DESCRIPTION OF THE DRAWINGS

FIG. 1 is a plan view showing an example of the structure of a display device DSP according to the present embodiment.

FIG. 2 is a sectional view showing the structure of a display area DA shown in FIG. 1.

FIG. 5 is a sectional view taken in a direction DR2 shown in FIG. 3.

FIG. 8 is a sectional view showing another example of the structure of the corner CN1.

DETAILED DESCRIPTION

Figure 3:
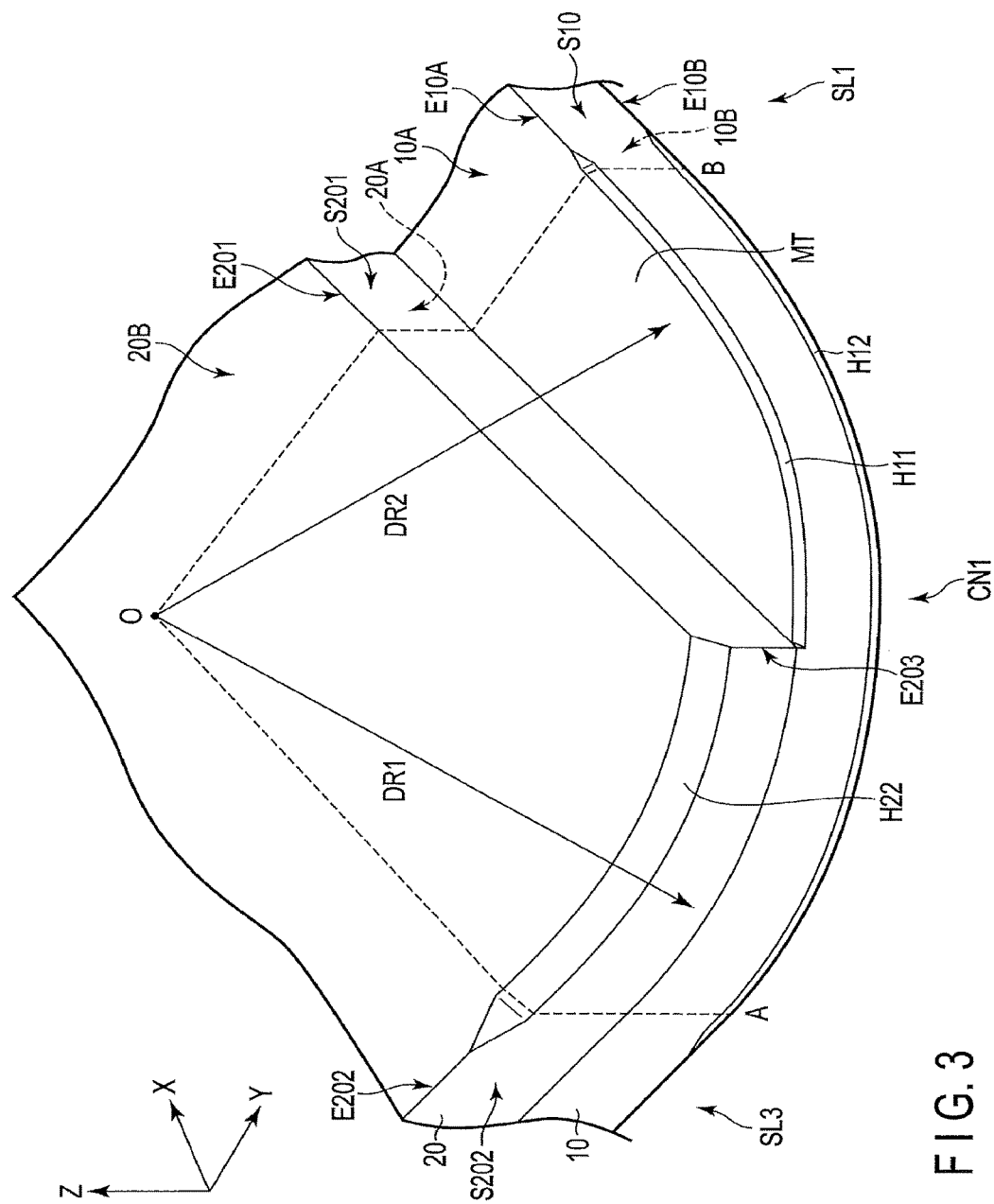
FIG. 3 is an enlarged perspective view showing the vicinity of a corner CN1 shown in FIG. 1.

In general, according to one embodiment, a display device includes a first substrate having a first surface, a second surface and a first side surface, and a second substrate having a third surface, a fourth surface and a second side surface. The first surface includes a connection surface formed in a terminal portion, the second surface is located on an opposite side to the first surface, and the first side surface is located between the first surface and the second surface. The third surface is opposed to the first surface except for the connection surface, the fourth surface is located on an opposite side to the third surface, and the second side surface is located between the third surface and the fourth surface. The first substrate has a first inclined surface which is continuous with the first surface and the first side surface in the terminal portion, the second substrate has a second inclined surface which is continuous with the fourth surface and the second side surface in a position adjacent to the terminal portion, and a first width of the first inclined surface is less than a second width of the second inclined surface.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a plan view showing an example of the structure of a display device DSP according to the present embodiment. FIG. 1 shows a three-dimensional space defined by a first direction X, a second direction Y perpendicular to the first direction X, and a third direction Z perpendicular to the first direction X and the second direction Y. The first direction X, the second direction Y and the third direction Z shown in the drawing perpendicularly intersect each other but may intersect each other at an angle other than 90 degrees.

In the present embodiment, a direction of the pointing end of an arrow indicating the third direction Z is defined as above, and a direction opposite to the direction of the pointing end of the arrow indicating the third direction Z is defined as below. Further, such expressions as "a second member above a first member" and "a second member below a first member" mean that the second member may be in contact with the first member or may be away from the first member. In the latter case, a third member may be interposed between the first member and the second member.

The following description will be based on the assumption that the display device DSP is a liquid crystal display device. The display device DSP may be another display device such as an organic electroluminescent (EL) display device which includes an organic EL element or an electronic paper-type display device which includes an electrophoretic element, etc.

The display device DSP includes a display panel PNL, a wiring substrate 1, a driver IC chip 2, etc.

The display panel PNL includes a substrate SUB1, a substrate SUB2, a liquid crystal layer (liquid crystal layer LC which will be described later), a sealant SE and a peripheral light-shielding layer BMA. The substrates SUB1 and SUB2 are glass substrates, for example. The substrate SUB1 and the substrate SUB2 are opposed to each other in the third direction Z and are attached to each other by the sealant SE with a predetermined cell gap formed between them. An area shaded with rising diagonal lines in the drawing indicates an area in which the sealant SE is provided. The liquid crystal layer is located in an area surrounded by the sealant SE between the substrate SUB1 and the substrate SUB2. The peripheral light-shielding layer BMA is arranged in a ring-like manner as indicated by falling diagonal lines in the drawing. In the example illustrated, the sealant SE entirely overlaps the peripheral light-shielding layer BMA.

The display panel PNL includes a display area DA on which an image is displayed, and a non-display area NDA which surrounds the display area DA and is located outside the display area DA. In the present embodiment, the display area DA is an area which is surrounded by the peripheral light-shielding layer BMA, and the non-display area NDA is an area in which the peripheral light-shielding layer BMA is provided.

The display panel PNL has a pair of sides SL1 and SL2 which extend in the first direction X and are opposed to each other in the second direction Y, a pair of sides SL3 and SL4 which extend in the second direction Y and are opposed to each other in the first direction X, and corners CN (CN1 to CN4) which are located between the pairs of intersecting sides. For example, each corner CN is curved and has a radius of curvature R1. That is, the corner CN corresponds to one fourth of the circumference of a circle CIR which is centered on a point O and has the radius R1. The point O is located in an area which overlaps the substrate SUB1 and the substrate SUB2. FIG. 1 shows the corner CN1 as an area between a position A and a position B. The position A corresponds to one end of the side SL3 in the second direction Y, and the position B corresponds to one end of the side SL1 in the first direction X.

The corners CN1 to CN4 may have different radii of curvature. Further, the corner CN may not be shaped in conformity with the circumference of a circle. As long as the corner CN is rounded, the corner CN can be formed in any shape, and for example, the corner CN may be shaped in conformity with the circumference of an ellipse or may be curved in conformity with a shape other than the circumferences of a circle and an ellipse.

In the example illustrated, the edges of the substrate SUB1 and the edges of the substrate SUB2 are aligned with each other except for the vicinity of the side SL1. The substrate SUB2 has a side SL5 which is parallel to the side SL1 and is located on the display area DA side from the side SL1. That is, the area of the substrate SUB2 is smaller than the area of the substrate SUB1 in an X-Y plane defined by the first direction X and the second direction Y. The substrate SUB1 has a terminal portion MT which extends in the second direction Y from the side SL5. In the example illustrated, the terminal portion MT is elongated in the first direction X.

The wiring substrate 1 is mounted on the terminal portion MT and is electrically connected to the display panel PNL. The wiring substrate 1 includes the driver IC chip 2. The driver IC chip 2 has a built-in display driver which outputs a signal necessary for image display, for example. The length of the side edge of the wiring substrate 1 which is parallel to the first direction X is less than the length of the side SL1 in the example illustrated, but may be equal to the length of the side SL1.

In the example illustrated, the width of the peripheral light-shielding layer BMA in the vicinity of the side SL5 is greater than the widths of the peripheral light-shielding layer BMA in the vicinities of the sides SL2, SL3 and SL4. That is, a width W5 of the peripheral light-shielding layer BMA arranged between the display area DA and the terminal portion MT is greater than widths W2, W3 and W4 of the peripheral light-shielding layer BMA arranged between the display area DA and the sides SL2, SL3 and SL4. Here, the widths W5 and W2 correspond to a dimension in the second direction Y, and the widths W3 and W4 correspond to a dimension in the first direction X.

The display panel PNL of the present embodiment may be a transmissive display panel which has a transmissive display function of displaying an image by selectively transmitting light from a back surface side of the substrate SUB1, a reflective display panel which has a reflective display function of displaying an image by selectively reflecting light from a front surface side of the substrate SUB2, or a transflective display panel which has both the transmissive display function and the reflective display function.

FIG. 2 is a sectional view showing the structure of the display area DA of the display panel PNL shown in FIG. 1. This is a sectional view of the display area DSP taken in the third direction Z. The illustrated display panel PNL conforms to a display mode of mainly using a lateral electric field which is substantially parallel to a substrate surface. The substrate surface here is a surface parallel to the X-Y plane.

The substrate SUB1 includes an insulating substrate 10, a signal line S, a common electrode CE, a metal layer M, a pixel electrode PE, a first insulating film 11, a second insulating film 12, a third insulating film 13, a first alignment film AL1, etc. Here, a switching element and a scanning line, and various insulating films interposed between them are not illustrated in the drawing.

The first insulating film 11 is located above the insulating substrate 10. The scanning line and a semiconductor layer of the switching element (not shown) are located between the insulating substrate 10 and the first insulating film 11. The signal line S is located on the first insulating film 11. The second insulating film 12 is located on the signal line S and the first insulating film 11. The common electrode CE is located on the second insulating film 12. The metal layer M contacts the common electrode CE directly above the signal line S. The metal layer M is located on the common electrode CE in the example illustrated but may be located between the common electrode CE and the second insulating film 12. The third insulating film 13 is located on the common electrode CE and the metal layer M. The pixel electrode PE is located on the third insulating film 13. The pixel electrode PE is opposed to the common electrode CE via the third insulating film 13. Further, the pixel electrode PE has a slit SL at a position opposed to the common electrode CE. The first alignment film AL1 covers the pixel electrode PE and the third insulating film 13.

The scanning line, the signal line S and the metal layer M may be formed of a metal material such as molybdenum, tungsten, titanium or aluminum and may have a single layer structure or a multilayer structure. The common electrode CE and the pixel electrode PE are formed of a transparent conductive material such as ITO or IZO. The first insulating film 11 and the third insulating film 13 are inorganic insulating films, and the second insulating film 12 is an organic insulating film.

The structure of the substrate SUB1 is not limited to the example illustrated, and the pixel electrode PE may be located between the second insulating film 12 and the third insulating film 13, and the common electrode CE may be located between the third insulating film 13 and the first alignment film AL1. In that case, the pixel electrode PE has the shape of a flat plate having no slit, and the common electrode CE has a slit which is opposed to the pixel electrode PE. Alternatively, the pixel electrode PE and the common electrode CE may have the shape of a comb and may be arranged such that they are engaged with each other.

The substrate SUB2 includes an insulating substrate 20, a light-shielding layer BM, a color filer CF, an overcoat layer OC, a second alignment film AL2, etc.

The light-shielding layer BM and the color filter CF are located on a side of the insulating substrate 20 which is opposed to the substrate SUB1. The light-shielding layer BM partitions the pixels and is located directly above the signal lines S. The color filter CF is opposed to the pixel electrode PE and partially overlaps the light-shielding layer BM. The color filter CF includes a red color filter, a green color filter, a blue color filter, etc. The overcoat layer OC covers the color filter CF. The second alignment film AL2 covers the overcoat layer OC.

The color filter CF may be arranged on the substrate SUB1. The color filter CF may include color filters corresponding to four or more colors. In the pixel for white display, a white color filter or an uncolored resin material may be arranged, or the overcoat layer OC may be arranged without any color filter.

A first optical element OD1 including a first polarizer PL1 is located between the insulating substrate 10 and an illumination device BL. A second optical element OD2 including a second polarizer PL2 is located above the insulating substrate 20. The first optical element OD1 and the second optical element OD2 may include retardation films when needed.

The display panel PNL may conform to a display mode of using a longitudinal electric field which is perpendicular to the substrate surface, a display mode of using an oblique electric field which is inclined with respect to the substrate surface, or a display mode of using a combination thereof. In the display mode of using the longitudinal electric field or the oblique electric field, for example, one of the pixel electrode PE and common electrode CE may be provided on the substrate SUB1, and the other one of the pixel electrode PE and the common electrode CE may be provided on the substrate SUB2.

FIG. 3 is an enlarged perspective view showing the vicinity of the corner CN1 shown in FIG. 1.

The insulating substrate 10 has a first surface 10A, a second surface 10B, a side surface S10, and edges E10A and E10B. The first surface 10A is opposed to the insulating substrate 20. The second surface 10B is a surface opposite to the first surface 10A. The side surface S10 is located across the side SL1, the corner CN1 and the side SL3, and is continuous with the first surface 10A and the second surface 10B. For example, the side surface S10 is a flat surface parallel to an X-Z plane in the side SL1, and is a flat surface parallel to a Y-Z plane in the side SL3. Further, the side surface S10 is curved and has the radius of curvature R1 shown in FIG. 1 at the corner CN1. The edge E10A corresponds to the boundary between the side surface S10 and the first surface 10A. The edge E10B corresponds to the boundary between the side surface S10 and the second surface 10B.

The insulating substrate 20 has a third surface 20A, a fourth surface 20B, side surfaces S201 and S202, and edges E201, E202 and E203. The third surface 20A is opposed to the insulating substrate 10. The fourth surface 20B is a surface opposite to the third surface 20A.

Both of the side surfaces S201 and S202 are continuous with the third surface 20A and the fourth surface 20B. The side surface S201 is a surface opposed to the terminal portion MT, and in the example illustrated, the side surface S201 is elongated in the first direction X. For example, the side surface S201 is a flat surface parallel to the X-Z plane. The edges of the side surface S201 in the first direction X are located at the corner CN1 and the corner CN2 (not shown), respectively. The side surface S202 is located from the side SL3 to part of the corner CN1 and is continuous with the side surface S201 at the corner CN1. For example, the side surface S202 is a flat surface parallel to the Y-Z plane in the side SL3, and is curved at the corner CN1 as in the case of the side surface S10 of the insulating substrate 10.

The edge E201 corresponds to the boundary between the side surface S201 and the fourth surface 20B. The edge E202 corresponds to the boundary between the side surface S202 and the fourth surface 20B. The edge S203 corresponds to the boundary between the side surface S201 and the side surface S202. The edge S201 corresponds to the side SL5 shown in FIG. 1.

In the present embodiment, the insulating substrate 10 and the insulating substrate 20 are chamfered at the corner CN1.

In the insulating substrate 10, the edge E10A on the first surface 10A side and the edge E10B on the second surface 10B side are chamfered. The edge E10A is chamfered only in the terminal portion MT. That is, the edge E10A is chamfered only in an area in which the insulating substrate 10 extends outward beyond the insulating substrate 20 at the corner CN1. On the other hand, the edge E10B is chamfered throughout the entire corner CN1. In other words, the insulating substrate 10 has an inclined surface H11 located on the first surface 10A side in the terminal portion MT, and an inclined surface H12 located on the second surface 10B side at the entire corner CN1.

In the insulating substrate 20, the edge E202 is chamfered. In the example illustrated, the edge E202 is chamfered throughout the entire corner CN1. In other words, the insulating substrate 20 has an inclined surface H22 located on the fourth surface 20B side at a position adjacent to the terminal portion MT. On the other hand, the edge E201 is not chamfered. As will be described later, the width of the inclined surface H11 is less than the width of the inclined surface H22 in the present embodiment. In the present embodiment, the "inclined surface" includes both a flat surface and a curved surface. If the inclined surface is a curved surface, the inclined surface may be a concave surface or may be a convex surface as will be described later.

Although not shown in the drawing, the insulating substrates 10 and 20 are chamfered also at the corners CN2, CN3 and CN4 as in the case of the corner CN1. Further, the insulating substrates 10 and 20 are chamfered only at the corner CN1 in the example illustrated but may be chamfered also in the sides SL1 and SL3.

Figure 4:
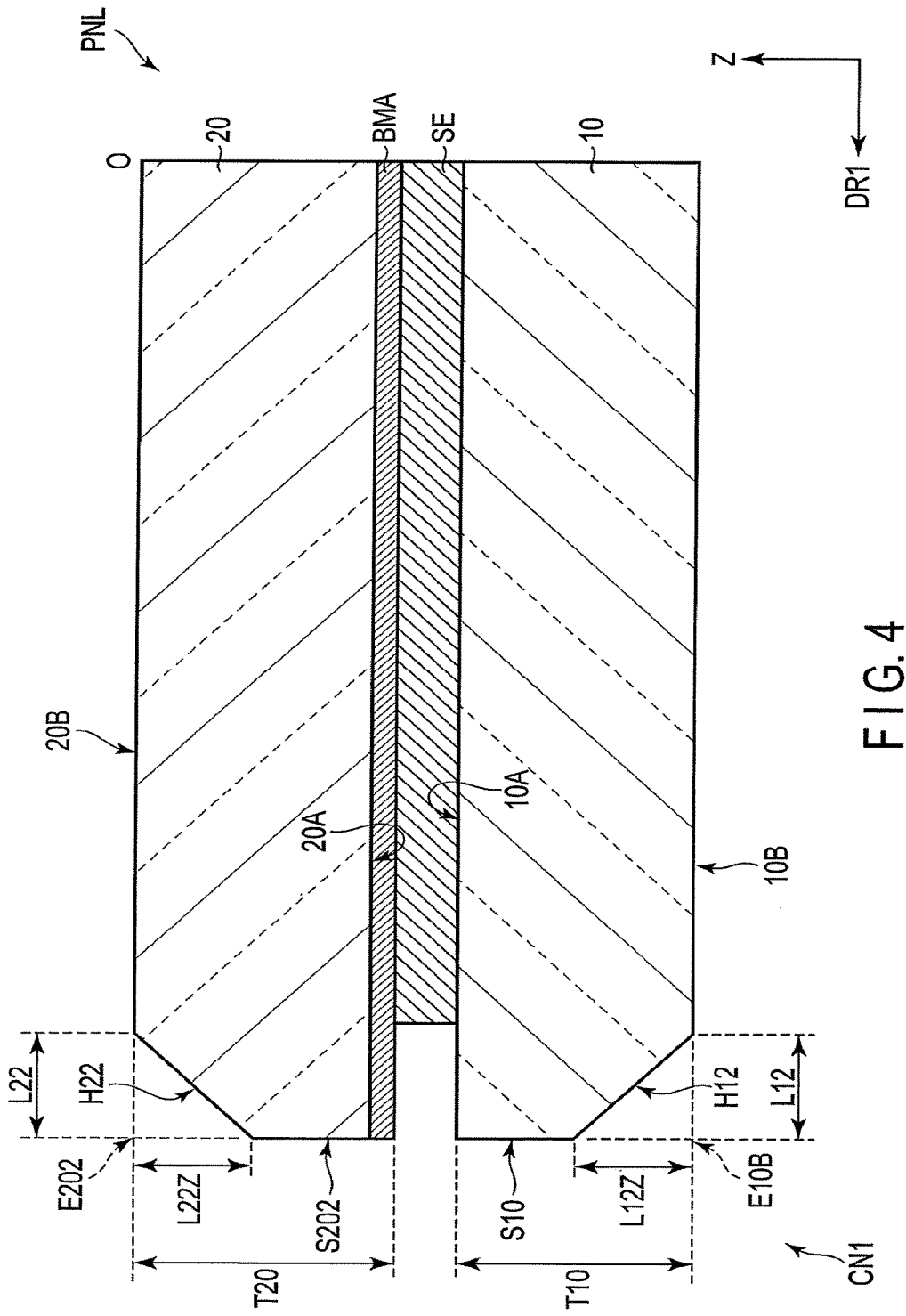
FIG. 4 is a sectional view taken in a direction DR1 shown in FIG. 3.

FIG. 4 is a sectional view taken in a direction DR1 shown in FIG. 3. The direction DR1 is a radial direction of the corner CN1 with reference to the point O. Here, the direction DR1 is parallel to the X-Y plane and is a direction from the point O to the inclined surface H22. FIG. 4 shows a DR1-Z plane defined by the direction DR1 and the third direction Z. Here, only structural elements necessary for explanations are illustrated in the drawing, and illustrations of an insulating film, an alignment film, etc. are omitted in the drawing.

The display panel PNL includes the insulating substrate 10, the insulating substrate 20, the sealant SE and the peripheral light-shielding layer BMA.

The insulating substrate 10 has the first surface 10A, the second surface 10B opposite to the first surface 10A, and the side surface S10 located between the first surface 10A and the second surface 10B. The insulating substrate 20 has the third surface 20A, the fourth surface 20B opposite to the third surface 20A, and the side surface S202 located between the third surface 20A and the fourth surface 20B. The first surface 10A, the second surface 10B, the third surface 20A and the fourth surface 20B are flat surfaces parallel to the X-Y plane. Further, the side surfaces S10 and S202 are flat surfaces parallel to the third direction Z. The insulating substrate 10 and the insulating substrate 20 are attached to each other by the sealant SE such that the first surface 10A and the third surface 20A are opposed to each other. In the example illustrated, the position of the side surface S10 in the direction DR1 and the position of the side surface S202 in the direction DR1 coincide with each other.

In the insulating substrate 10, the edge E10B on the second surface 10B side is chamfered as described above. That is, the insulating substrate 10 has the inclined surface H12 which is continuous with the side surface S10 and the second surface 10B. In the example illustrated, the inclined surface H12 is a flat surface and is inclined such that a thickness T10 of the insulating substrate 10 decreases toward the side surface S10.

In the insulating substrate 20, the edge E202 on the fourth surface 20B side is chamfered as described above. That is, the insulating substrate 20 has the inclined surface H22 which is continuous with the side surface S202 and the fourth surface 20B. In the example illustrated, the inclined surface H22 is a flat surface and is inclined such that a thickness T20 of the insulating substrate 20 decreases toward the side surface S202.

For example, a width L12 of the inclined surface H12 in the insulating substrate 10 and a width L22 of the inclined surface H22 in the insulating substrate 20 are equal to each other. Here, the width L12 is a dimension of an area in which the inclined surface H12 is formed from the side surface 10S side end to the second surface 20B side end in the direction DR1. Similarly, the width L22 is a dimension of an area in which the inclined surface H22 is formed from the side surface S202 side end to the fourth surface 20B side end in the direction DR1.

In the example illustrated, both of the insulating substrates 10 and 20 are C-chamfered. That is, in the insulating substrate 10, a width L12Z of the inclined surface H12 in the third direction Z is equal to the width L12 of the inclined surface H12 in the direction DR1. Further, in the insulating substrate 20, a width L22Z of the inclined surface H22 in the third direction Z is equal to the width L22 of the inclined surface H22 in the direction DR1. The width L12Z may differ from the width L12, and the width L22Z may differ from the width L22.

In the example illustrated, the peripheral light-shielding layer BMA is provided on the entire third surface 20A, and one end in the direction DR1 is aligned with the side surfaces S10 and S202. That is, the peripheral light-shielding layer BMA overlaps the inclined surfaces H12 and H22 in the third direction Z. On the other hand, the sealant SE is away from the side surfaces S10 and S202. For example, the sealant SE does not overlap the inclined surfaces H12 and H22 in the third direction Z.

FIG. 5 is a sectional view taken in a direction DR2 shown in FIG. 3. The direction DR2 is a radial direction of the corner CN1 with reference to the point O. Here, the direction DR2 is parallel to the X-Y plane and is a direction from the point O to the terminal portion MT. FIG. 5 shows a DR2-Z plane defined by the direction DR2 and the third direction Z.

The insulating substrate 10 has the terminal portion MT which extends outward beyond the insulating substrate 20 in the direction DR2. Here, the terminal portion MT corresponds to a portion of the insulating substrate 10 which extends outward beyond the side surface S201 of the insulating substrate 20. The first surface 10A includes a connection surface CS located in the terminal portion. In other words, the connection surface CS corresponds to an area of the first surface 10A which extends outward beyond the insulating substrate 20. The third surface 20A is opposed to the first surface 10A except for the connection surface CS.

The side surface S201 is located between the third surface 20A and the fourth surface 20B and is a surface parallel to the third direction Z, for example. In the cross-section taken in the direction DR2, the edges of the insulating substrate 20 are not chamfered.

In the insulating substrate 10, the edge E10B and the edge E10A are chamfered in the terminal portion MT as described above. That is, in addition to the inclined surface H12, the insulating substrate 10 also has the inclined surface H11 which is continuous with the side surface S10 and the first surface 10A in the terminal portion MT. In the example illustrated, the inclined surface H11 is a flat surface and is inclined such that the thickness T10 of the insulating substrate 10 decreases toward the side surface S10.

In the present embodiment, a width L11 of the inclined surface H11 is less than the width L12 of the inclined surface H12. Here, the width L11 is a dimension of an area in which the inclined surface H11 is formed from the side surface S10 side end to the first surface 10A side end in the direction DR2. Similarly, the width L12 is a dimension of an area in which the inclined surface H12 is formed from the side surface S10 side end to the second surface 10B side end in the direction DR2. The width L12 is equal to the width L12 shown in FIG. 4. Since the width L11 is less than the width L12, a length L10A of the first surface 10A in the terminal portion MT (that is, the length of the connection surface CS) is greater than a length L10B of the second surface 10B in the terminal portion MT. Here, the lengths L10A and L10B correspond to a dimension in the direction DR2.

In the example illustrated, the edge E10A is C-chamfered. That is, a width L11Z of the inclined surface H11 in the third direction Z is equal to the width L11 of the inclined surface H11 in the direction DR2. The width L11Z may differ from the width L11.

The method of forming the inclined surfaces H11, H12 and H22 is not limited to any particular method. The inclined surfaces H11, H12 and H22 may be formed by polishing, etching or laser irradiation, for example.

According to the present embodiment, the insulating substrate 10 and the insulating substrate 20 are chamfered. Therefore, microcracks and microchipping, etc., which cause cracks of the insulating substrates 10 and 20 can be prevented at the edges of the insulating substrates 10 and 20. Consequently, the strength of the insulating substrates 10 and 20 can be improved.

Further, in the terminal portion MT, the width L11 of the inclined surface H11 located on the first surface 10A side is less than the width L12 of the inclined surface H12 located on the second surface 10B side and the width L22 of the inclined surface H22 of the insulating substrate 20. Therefore, the area of the first surface 10A becomes larger than the area of the second surface 10B in the terminal portion MT. This structure is preferable when the wiring substrate 1 is mounted on the first surface 10A.

Further, chamfering is performed at the corners CN. The corners CN are formed by polishing, etc., after glass substrates are cut into rectangular pieces, for example. Alternatively, the corners CN are formed by cutting into a curved shape when glass substrates are cut into pieces by a laser, for example. According to the present embodiment, even if microcracks and microchipping, etc., are caused at the edges of the insulating substrates 10 and 20 in the process of forming the corners CN, such areas will be removed by chamfering, and therefore the strength of the insulating substrates 10 and 20 can be improved.

Figure 6:
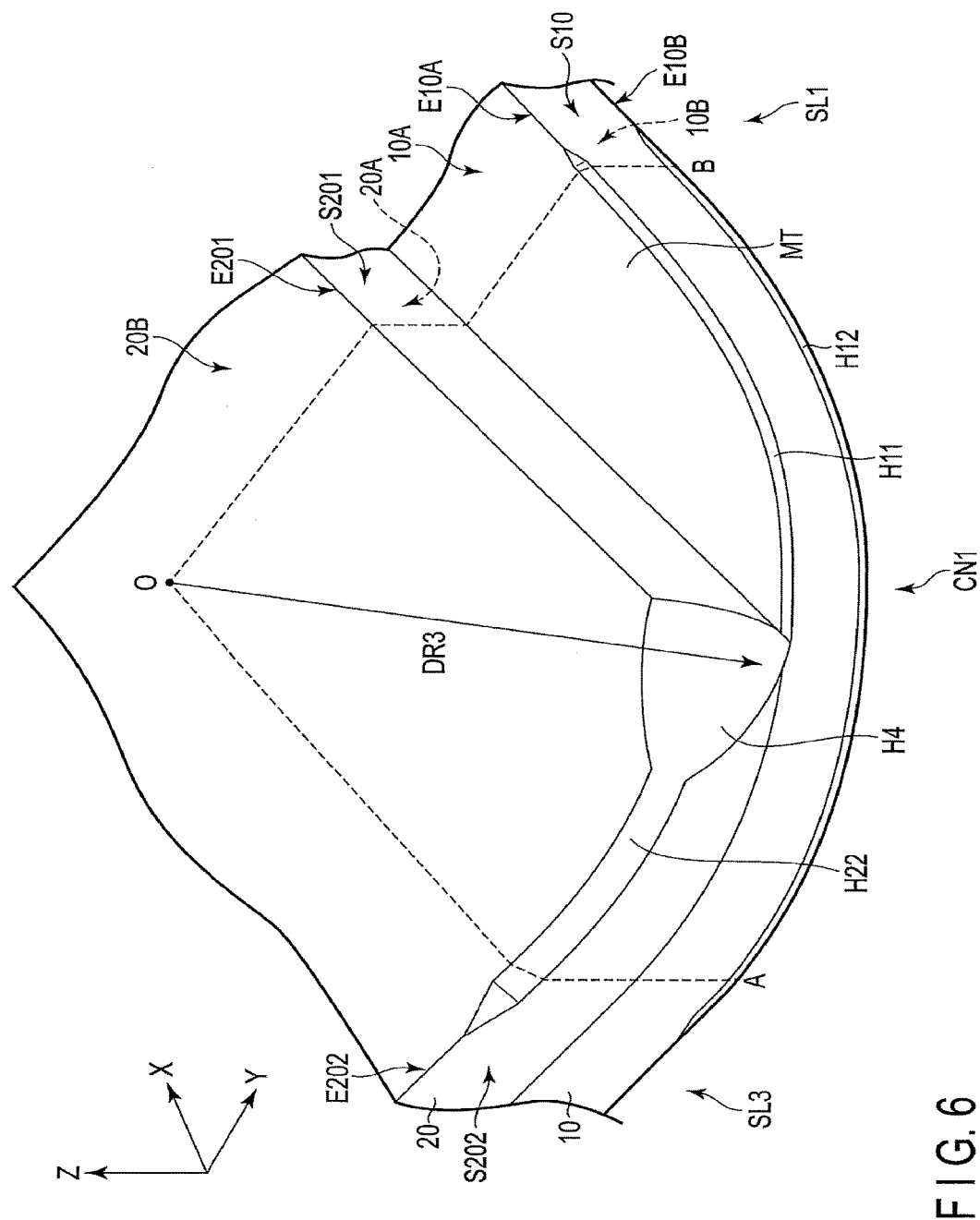
FIG. 6 is a perspective view showing another example of the structure of the corner CN1.

FIG. 6 is a perspective view showing another example of the structure of the corner CN1.

The structural example shown in FIG. 6 differs from the structural example shown in FIG. 3 in that the insulating substrate 20 has an inclined surface H4 located between the side surface S201 and the side surface S202. The inclined surface H4 is formed in an area in the vicinity of the edge E203 shown in FIG. 3. That is, the edge E203 is entirely chamfered in the structural example shown in FIG. 6. In the example illustrated, the inclined surface H4 is continuous with the inclined surface H22. Further, an end of the edge E201 in the first direction X at the corner CN1 is chamfered.

In the example illustrated, the insulating substrate 20 is integrally chamfered with the insulating substrate 10. That is, the inclined surface H11, the inclined surface H4 and the inclined surface H22 are continuously formed with each other.

Figure 7A:
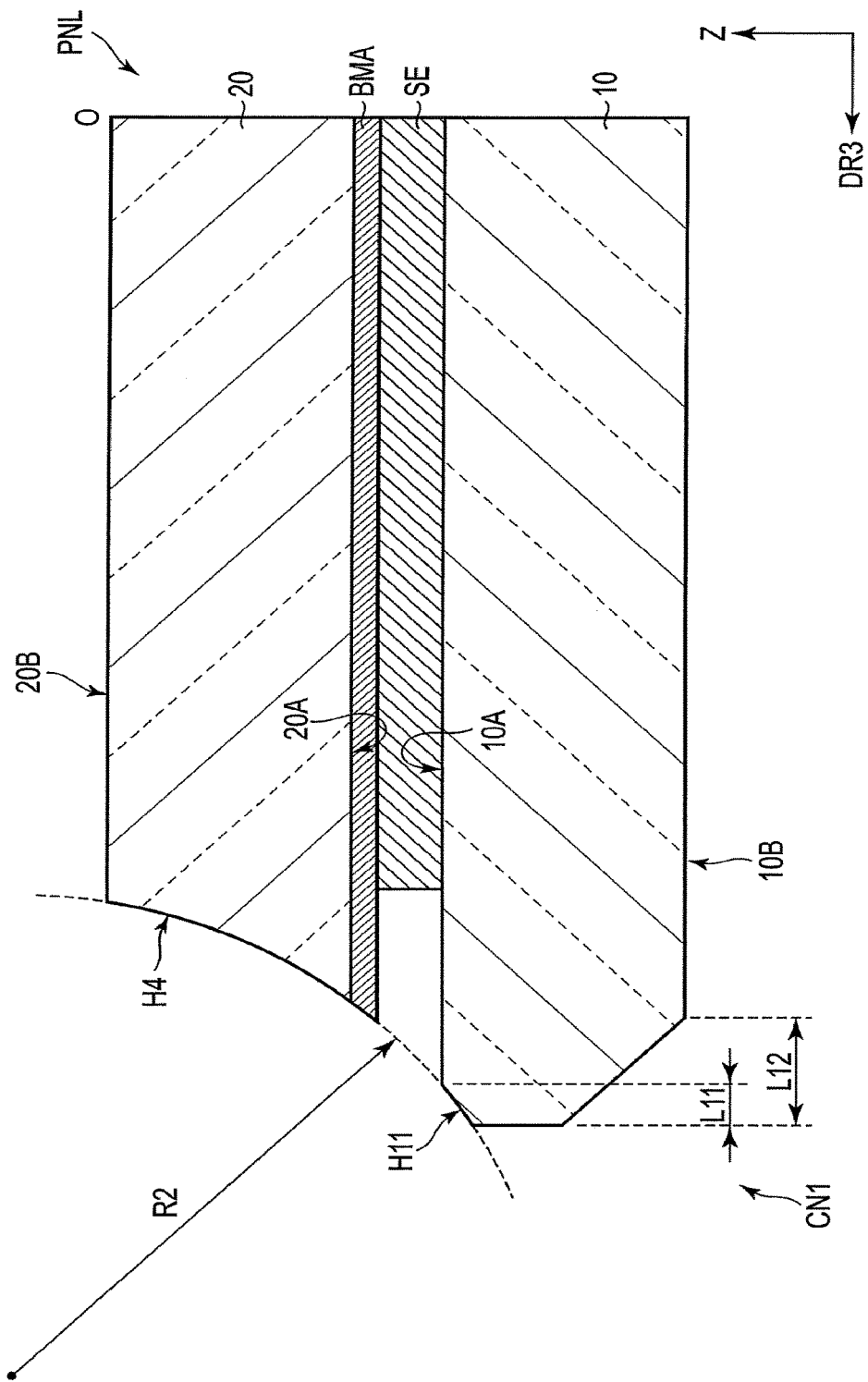
FIG. 7A is a sectional view taken in a direction DR3 shown in FIG. 6.

FIG. 7A is a sectional view taken in a direction DR3 shown in FIG. 6. The direction DR3 is a radial direction of the corner CN1 with reference to the point O. Here, the direction DR3 is parallel to the X-Y plane and is a direction from the point O to the inclined surface H4. FIG. 7A shows a DR3-Z plane defined by the direction DR3 and the third direction Z.

The inclined surface H4 is located on the point O side, that is, the display area DA side from the inclined surface H11 in the direction DR3. The inclined surface H4 is continuous with the fourth surface 20B and the third surface 20A. The inclined surface H4 is a concave surface having a radius of curvature R2, for example. In the example illustrated, the insulating substrate 20, the peripheral light-shielding layer BMA and the insulating substrate 10 are integrally chamfered with each other. That is, the inclined surface H11 is a concave surface similar to the inclined surface H4. More specifically, the radius of curvature (third radius of curvature) of the inclined surface H11 is equal to the radius of curvature (fourth radius of curvature) of the inclined surface H4, and the position of the center of curvature of the inclined surface H11 is equal to the position of the center of curvature of the inclined surface H4. The inclined surface H11 and the inclined surface H4 may have different radii of curvature. Further, the structure of the terminal portion MT is the same as that shown in FIG. 5 except that the inclined surface H11 is a concave surface.

In the example illustrated, the width L11 of the inclined surface H11 is less than the width L12 of the inclined surface H12 in the insulating substrate 10. Here, the width L11 is a dimension of an area in which the inclined surface H11 is formed in the direction DR3. Similarly, the width L12 is a dimension of an area in which the inclined surface H12 is formed in the direction DR3. The width L12 is equal to the width L12 shown in FIGS. 4 and 5. Note that the second surface 10B side of the insulating substrate 10 may not be chamfered.

The present structural example can also produce the same effect as that of the structural example shown in FIG. 3. Further, according to the present structural example, the edge E10A of the insulating substrate 10, and the edges E201, E202 and E203 of the insulating substrate 20 can be chamfered in the same manufacturing process. That is, after the terminal portion MT and the corner CN1 are formed, the edge E10A is chamfered, for example, from the side SL1 side to the side SL3 side, and consequently, the inclined surface H11 and the inclined surface H4 will be continu-ously formed. Further, the structural example shown in FIGS. 6 and 7 can be applied also to the corner CN2. Therefore, the number of manufacturing processes can be reduced.

Figure 7B:
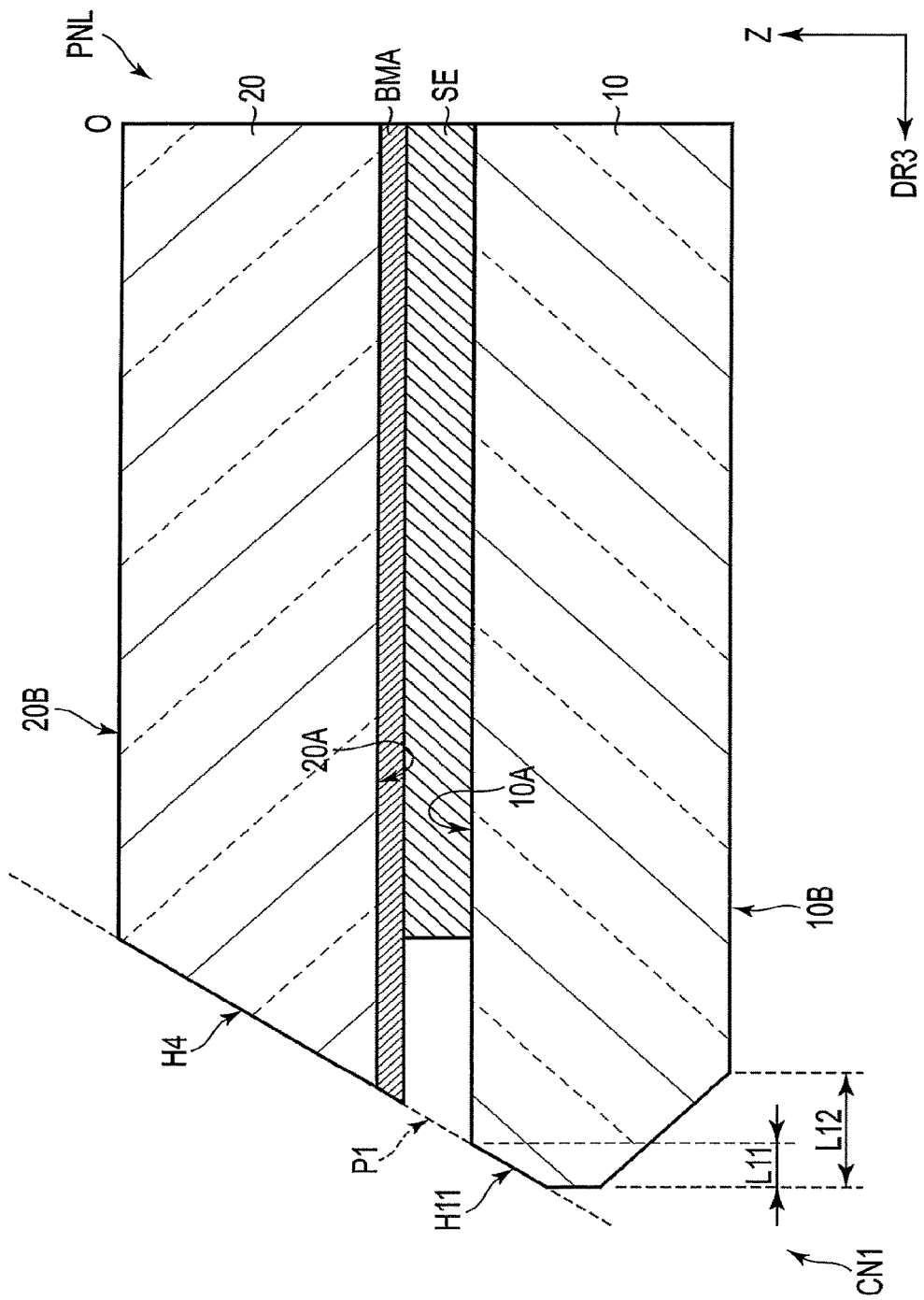
FIG. 7B is a sectional view showing another example of the structure of the corner CN1.

FIG. 7B is a sectional view showing another example of the structure of the corner CN1. The structural example shown in FIG. 7B differs from the structural example shown in FIG. 7A in that the inclined surfaces H4 and H11 are flat surfaces.

In the example illustrated, the inclined surface H4 and the inclined surface H11 are integrally formed with each other. That is, the inclined surface H4 and the inclined surface H11 have the same angle of inclination and are located on the same plane P1. The angle of inclination of the inclined surface H4 and the angle of inclination of the inclined surface H11 can be appropriately changed. The inclined surface H4 and the inclined surface H11 may have different angles of inclination and may be located on different planes.

The present structural example can also produce the same effect as that of the structural example shown in FIG. 7A.

FIG. 8 is a sectional view showing another example of the structure of the corner CN1. FIG. 8 shows a cross-section parallel to the DR2-Z plane defined by the direction DR2 and the third direction Z. The structural example shown in FIG. 8 differs from the structural example shown in FIG. 5 in that the inclined surfaces H11 and H12 are convex surfaces.

In the example illustrated, the inclined surface H11 is a curved surface having a radius of curvature R3, and the inclined surface H12 is a curved surface having a radius of curvature R4. For example, the radius of curvature (first radius of curvature) R3 of the inclined surface H11 is less than the radius of curvature (second radius of curvature) R4 of the inclined surface H12. Therefore, in the present structural example also, the length L10A of the first surface 10A is greater than the length L10B of the second surface 10B in the terminal portion MT.

The present structural example can also produce the same effect as that of the structural example shown in FIG. 5.

As described above, according to the present embodiment, a display device which can improve the strength of substrates can be provided.

In the present embodiment, the insulating substrate 10 corresponds to a first substrate, and the second substrate 20 corresponds to a second substrate. The side surface S10 of the insulating substrate 10 corresponds to a first side surface, the inclined surface H11 corresponds to a first inclined surface, and the inclined surface H12 corresponds to a third inclined surface. The side surface S202 of the insulating substrate 20 corresponds to a second side surface, the side surface S201 corresponds to a third side surface, the inclined surface H22 corresponds to a second inclined surface, and the inclined surface H4 corresponds to a fourth inclined surface. The width L11 of the inclined surface H11 corresponds to a first width, the width L22 of the inclined surface H22 corresponds to a second width, and the width L12 of the inclined surface H12 corresponds to a third width. Further, the side SL1 of the display panel PNL corresponds to a first side, and the side SL3 corresponds to a second side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate having a first surface, a second surface and a first side surface, the first surface including a connection surface formed in a terminal portion, the second surface opposite to the first surface, the first side surface located between the first surface and the second surface; and
   a second substrate having a third surface, a fourth surface and a second side surface, the third surface opposed to the first surface except for the connection surface, the fourth surface opposite to the third surface, the second side surface located between the third surface and the fourth surface, wherein
   the first substrate has a first inclined surface which is continuous with the first surface and the first side surface in the terminal portion,
   the second substrate has a second inclined surface which is continuous with the fourth surface and the second side surface at a position adjacent to the terminal portion, and
   a first width of the first inclined surface is less than a second width of the second inclined surface.

2. The display device of claim 1, further comprising:
   a first side in a first direction;
   a second side in a second direction which intersects the first direction; and
   a curved corner located between the first side and the second side.

3. The display device of claim 2, wherein the first inclined surface and the second inclined surface are located at the corner.

4. The display device of claim 2, wherein
   the first side surface is located between the first surface and the second surface across the first side, the second side and the corner, and
   the second side surface is located between the third surface and the fourth surface across the second side and at least part of the corner.

5. The display device of claim 3, wherein
   the second substrate further has a third side surface which is elongated along the first side and is located between the third surface and the fourth surface,
   the second inclined surface and the second side surface are continuous with the third side surface, and
   the terminal portion extends outward beyond the third side surface.

6. The display device of claim 2, wherein the first substrate further has a third inclined surface which is continuous with the second surface and the first side surface.

7. The display device of claim 6, wherein a third width of the third inclined surface is equal to the second width.

8. The display device of claim 6, wherein the third inclined surface is located throughout the entire corner.

9. The display device of claim 6, wherein the first inclined surface and the third inclined surface are convex surfaces.

10. The display device of claim 9, wherein a first radius of curvature of the first inclined surface is less than a second radius of curvature of the third inclined surface.

11. The display device of claim 1, wherein
    the second substrate has a third side surface which is elongated along the terminal portion and is located between the third surface and the fourth surface, and a fourth inclined surface which is located between the second side surface and the third side surface, and
    the fourth inclined surface is a concave surface which is continuous with the third surface and the fourth surface.

12. The display device of claim 11, wherein
    the first inclined surface is a concave surface, and
    a third radius of curvature of the first inclined surface and a fourth radius of curvature of the fourth inclined surface are equal to each other.

13. The display device of claim 12, wherein a position of a center of curvature of the first inclined surface and a position of a center of curvature of the fourth inclined surface are equal to each other.

14. The display device of claim 1, wherein
    the second substrate has a third side surface which is elongated along the terminal portion and is located between the third surface and the fourth surface, and a fourth inclined surface which is located between the second side surface and the third side surface, and
    the fourth inclined surface and the first inclined surface are flat surfaces.

15. The display device of claim 14, wherein the fourth inclined surface and the first inclined surface are located on a same plane.

16. The display device of claim 2, further comprising:
    a display area;
    a non-display area located outside the display area; and
    a light-shielding layer arranged in the non-display area, wherein
    a width of the light-shielding layer located between the display area and the terminal portion in the second direction is greater than a width of the light-shielding layer located between the display area and the second side in the first direction.

* * * * *